US010176237B2

(12) United States Patent
Nadgir et al.

(10) Patent No.: US 10,176,237 B2
(45) Date of Patent: *Jan. 8, 2019

(54) GRAPHICALLY DISPLAYING LIFECYCLE INFORMATION OF A GOVERNED OBJECT IN A SERVICE REGISTRY IN COMBINATION WITH THE POLICIES ASSERTED FOR THE LIFECYCLE STATES (75) Inventors: Devaprasad K. Nadgir, Bangalore (IN); Vijay C. Telukapalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1390 days.

This patent is subject to a terminal disclaimer.

(21) Appl. No.: 13/405,334

(22) Filed: Feb. 26, 2012

(65) Prior Publication Data
US 2012/0296893 A1    Nov. 22, 2012

Related U.S. Application Data (63) Continuation of application No. 13/111,635, filed on May 19, 2011.

(51) Int. Cl.
*G06F 17/30* (2006.01)
*G06Q 10/06* (2012.01)

(52) U.S. Cl.
CPC . *G06F 17/30554* (2013.01); *G06Q 10/06313* (2013.01)

(58) Field of Classification Search
CPC .......... G06F 17/30309; G06F 11/3003; G06F 17/30557; Y10S 707/99945;
(Continued)

(56) References Cited

U.S. PATENT DOCUMENTS 6,880,084 B1    4/2005    Brittenham et al.
7,509,627 B1    3/2009    Ayachitula et al.
(Continued)

OTHER PUBLICATIONS

Office Action for U.S. Appl. No. 13/111,635 dated Oct. 24, 2012.
(Continued)

*Primary Examiner* — Dennis Truong
(74) *Attorney, Agent, or Firm* — Robert A. Voigt, Jr.; Winstead, P.C.

(57) ABSTRACT

A method for graphically displaying lifecycle information of a governed object in a service registry in combination with the policies associated with the lifecycle states. Properties (e.g., object type, current lifecycle state) are retrieved for a governed object. Additionally, lifecycle definitions for the current lifecycle state and one or more potential future lifecycle states associated with the governed object are retrieved. Furthermore, policy definitions that apply to the object type, the current lifecycle state and one or more potential future lifecycle states are retrieved. A table is then built that correlates the retrieved lifecycle definitions with the retrieved policy definitions. A graphical representation is generated detailing the current lifecycle state, transitions to the one or more potential future lifecycle states and the policy definitions that apply to each transition for the governed object based on the built table.

7 Claims, 4 Drawing Sheets (58) Field of Classification Search
CPC ..... Y10S 707/99954; Y10S 707/99948; H04L 67/02; G06Q 10/06313
USPC ......... 707/722, 694, 783, 999.203, E17.008; 717/101
See application file for complete search history.

(56) References Cited

U.S. PATENT DOCUMENTS

| | | | |
|---|---|---|---|
| 2003/0033191 A1* | 2/2003 | Davies et al. .................. | 705/10 |
| 2005/0228807 A1* | 10/2005 | McCauley ........ | G06F 17/30011 |
| 2005/0234849 A1* | 10/2005 | McCauley ........ | G06F 17/30309 |
| 2005/0251505 A1* | 11/2005 | McCauley ........ | G06F 17/30011 |
| 2007/0266394 A1* | 11/2007 | Odent et al. .................. | 719/316 |
| 2008/0005182 A1 | 1/2008 | Gauthier et al. | |
| 2008/0066048 A1* | 3/2008 | Hafermann et al. .......... | 717/100 |
| 2008/0066049 A1* | 3/2008 | Jain et al. ..................... | 717/101 |
| 2009/0083239 A1* | 3/2009 | Colgrave et al. .................. | 707/4 |
| 2010/0049628 A1 | 2/2010 | Mannava et al. | |
| 2010/0070561 A1 | 3/2010 | Dhoolia et al. | |
| 2010/0095266 A1 | 4/2010 | Novak | |
| 2010/0138760 A1 | 6/2010 | Isom | |
| 2010/0205224 A1 | 8/2010 | Palanisamy et al. | |
| 2010/0250320 A1 | 9/2010 | Channabasavaiah et al. | |
| 2010/0287016 A1* | 11/2010 | Isozaki et al. .................... | 705/7 |
| 2011/0196940 A1* | 8/2011 | Martinez ................. | H04L 29/06 709/217 |
| 2012/0011134 A1* | 1/2012 | Travnik et al. ............... | 707/756 |
| 2012/0144295 A1 | 6/2012 | Clark et al. | |

OTHER PUBLICATIONS

"Oracle Enterprise Repository and Oracle Service Registry for the SOA Lifecycle," http://www.oracle.com/us/technologies/048954.pdf, 2009.

"TIBCO ActiveMatrix Lifecycle Governance Framework," http://www.tibco.com/multimedia/ds-activematrix-lifecycle-governance-framework_tcm8-8838.pdf, 2009.

"HP SOA Systinet Software," http://new.j9tech.com/wp-content/uploads/2009/07/HP-SOA-systinet.pdf, Aug. 2008.

Office Action for U.S. Appl. No. 13/111,635 dated Jun. 4, 2014, pp. 1-20.

Office Action for U.S. Appl. No. 13/111,635 dated Jun. 19, 2013.

Office Action for U.S. Appl. No. 13/111,635 dated Oct. 22, 2014, pp. 1-31.

Office Action for U.S. Appl. No. 13/111,635 dated Dec. 10, 2015, pp. 1-24.

IBM, "Service Lifecycle Governance with IBM WebSphere Service Registry and Repository," by Hargrove et al. (2009), available at: http://www.redbooks.ibm.com/redbooks/pdfs/sg247793.pdf, Dec. 2009, pp. 1-626.

Desprets et al., "Using WebSphere Service Registry and Repository to implement and enforce a service life cycle," available at: http://www.ibm.com/developerworks/websphere/library techarticles/0706_desprets/0706_desprets.html, Jun. 6, 2007, pp. 1-14.

* cited by examiner

GRAPHICALLY DISPLAYING LIFECYCLE INFORMATION OF A GOVERNED OBJECT IN A SERVICE REGISTRY IN COMBINATION WITH THE POLICIES ASSERTED FOR THE LIFECYCLE STATES

CROSS-REFERENCE TO RELATED APPLICATIONS

The present application is a continuation application of pending U.S. patent application Ser. No. 13/111,635, which was filed on May 19, 2011, which is assigned to the assignee of the present invention. The present application claims priority benefits to U.S. patent application Ser. No. 13/111,635.

TECHNICAL FIELD

The present invention relates to service oriented environments, and more particularly to graphically displaying lifecycle information of a governed object in a service registry in combination with the policies associated with the lifecycle states.

BACKGROUND

A Service Oriented Architecture (SOA) is a business-driven IT architectural approach that supports integrating the business as linked, repeatable business tasks, or services. The basic building block is a service document that defines a service so that it can be managed with other services. A service document contains information about a service including the location of the service and details about the service and how to access the service. Service documents are used by analysts, architects, and developers during a development phase of the SOA lifecycle to locate services to reuse and to evaluate the impact of changes to service configurations. Service documents are variously described as metadata, objects, descriptions, entities and artifacts.

A service repository stores the service document and allows access to the service document and thereby the corresponding service. A service registry is an index of a subset of information about a service (for example the location and name of service document) enabling the corresponding service document to be located and accessed in a repository (or even the corresponding service located at the service provider). An integrated service registry and repository allows a service operation to use both the indexed service information in the registry and the detailed service information in the repository. An example of an integrated service registry and repository is IBM® WebSphere® Registry and Repository (WSRR).

Such an integrated service registry and repository has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the lifecycle of the service. Standards-based service metadata artifacts, such as Web Service Definition Language (WSDL), Extensible Mark-up Language (XML) schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purpose it serves.

A policy is a rule that is applied to an object by an environment. For instance, access to an object can be controlled by applying a rule that only entities with a certain token can have access to the object. W3C (World Wide Web Consortium) is a community working together to develop interoperable internet technology. WS-Policy is a W3C WS (Web Service) standard that is intended to provide a means for specifying policies that need to be applied to web services and specifically service documents. A policy can be a generic policy as defined in the WS-Policy framework or it can be a domain specific policy as defined in a policy domain. The WS-Policy-Attach specification (also controlled by the W3C) specifies a standard means by which policy attachments can be defined to link a policy to a service object referenced in a service document.

Service objects or logical objects are derived from documents (WSDL (Web Service Definition Language) documents; XSD (XML schema definition) documents; XML (extensible mark-up language) documents, WS-Policy documents etc.) when they are loaded into the service registry environment. The WS-Policy-Attach specification declares different means of specifying policy attachments that link specific policies to target subjects: embedded policies in WSDL documents; embedded policy references in WSDL documents; embedded policy references from policyURI (Universal Resource Indicator) attributes in WSDL documents; embedded policies in external policy attachment files; and embedded policy references in external policy attachment files.

These service or logical objects can be transitioned through states defined in a lifecycle (e.g., assemble, deploy, manage, retire), and the resulting states will be reflected in the classification metadata associated with these objects. The service registry console or Application Programming Interfaces (APIs) can be used to locate and use the objects based upon these classifications.

Lifecycle definitions for these objects in the service registry are defined by a standard representation called State Adaptive Choreography Language (SACL). While a SACL infrastructure to manage the lifecycle of objects in the service registry gives a flexible framework to represent objects with states and transitions, it lacks the ability to pictorially present to end users information about the current lifecycle state, next lifecycle states, possible transitions and constraints represented as policy assertions on the transitions (e.g., WS-Policy assertions). That is, the current representation of lifecycle states in SACL and policies are in a disjoint and disconnected manner thereby making it difficult for the end user to predict the next possible lifecycle states as well as the policies that apply to each next possible transition.

BRIEF SUMMARY

In one embodiment of the present invention, a method for graphically displaying lifecycle information of a governed object in combination with policies associated with lifecycle states comprises retrieving properties of the governed object, where the properties comprise an object type and a current lifecycle state. The method further comprises retrieving lifecycle definitions for the current lifecycle state and one or more potential future lifecycle states associated with the governed object. In addition, the method comprises retrieving policy definitions that apply to the object type, the current lifecycle state and the one or more potential future lifecycle states. Additionally, the method comprises building a table correlating the lifecycle definitions for the current lifecycle state and the one or more potential future lifecycle states with the policy definitions. Furthermore, the method comprises generating, by a processor, a graphical representation detailing the current lifecycle state, transitions to the one or more potential future lifecycle states and the policy definitions that apply to each transition for the governed object using the table.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for graphically displaying lifecycle information of a governed object in a service registry in combination with the policies associated with the lifecycle states. In one embodiment of the present invention, a software component, referred to herein as the "governance lifecycle view adapter," in the service registry retrieves a governance record for a governed object to obtain historical information (e.g., previous transitions and states of the object). The governance lifecycle view adapter further retrieves properties (e.g., object type, current lifecycle state) of the governed object. Additionally, the governance lifecycle view adapter retrieves lifecycle definitions for the current lifecycle state and one or more potential future lifecycle states associated with the governed object. Furthermore, the governance lifecycle view adapter retrieves policy definitions that apply to the object type, the current lifecycle state and the one or more potential future lifecycle states. A table is then built that correlates the retrieved lifecycle definitions for the current lifecycle state and the one or more potential future lifecycle states with the retrieved policy definitions. The governance lifecycle view adapter may then generate a graphical representation detailing the current lifecycle state, transitions to the one or more potential future lifecycle states and the policy definitions that apply to each transition for the governed object based on the built table. In this manner, a graphical representation may be made that illustrates the current lifecycle state, next lifecycle states, possible transitions and constraints represented as policy assertions on the transitions.

While the following discusses a governed object as corresponding to service objects or logical objects derived from documents, a governed object, as used herein, may also include instances of such objects which individually have lifecycles. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
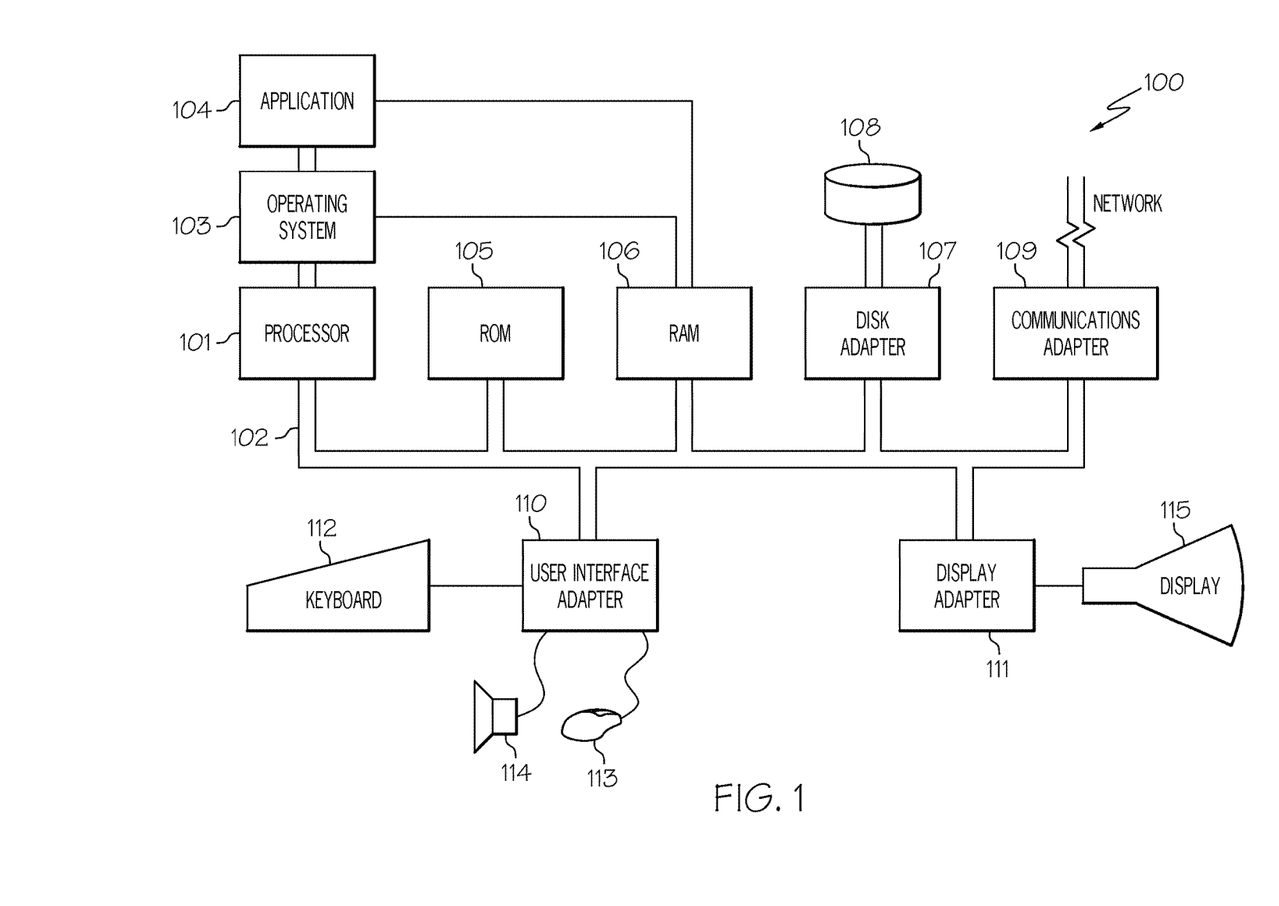
FIG. 1 is a hardware configuration of a data processing system in accordance with an embodiment of the present invention.

Referring now to the Figures in detail, FIG. 1 illustrates a hardware configuration of a computer system 100 which is representative of a hardware environment for practicing the present invention. Referring to FIG. 1, computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, an application for graphically displaying lifecycle information of a governed object in a service registry in combination with the policies associated with the lifecycle states as discussed further below in association with FIGS. 2-4.

Referring again to FIG. 1, read-only memory ("ROM") 105 is coupled to system bus 102 and includes a basic input/output system ("BIOS") that controls certain basic functions of computer device 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for graphically displaying lifecycle information of a governed object in a service registry in combination with the policies associated with the lifecycle states as discussed further below in association with FIGS. 2-4, may reside in disk unit 108 or in application 104.

Computer system 100 may further include a communications adapter 109 coupled to bus 102. Communications adapter 109 interconnects bus 102 with an outside network thereby enabling computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, lifecycle definitions for objects in the service registry are defined by a standard representation called State Adaptive Choreography Language (SACL). While a SACL infrastructure to manage the lifecycle of objects in the service registry gives a flexible framework to represent objects with states and transitions, it lacks the ability to pictorially present to end users information about the current lifecycle state, next lifecycle states, possible transitions and constraints represented as policy assertions on the transitions (e.g., WS-Policy assertions). That is, the current representation of lifecycle states in SACL and policies are in a disjoint and disconnected manner thereby making it difficult for the end user to predict the next possible lifecycle states as well as the policies that apply to each next possible transition.

Figure 2:
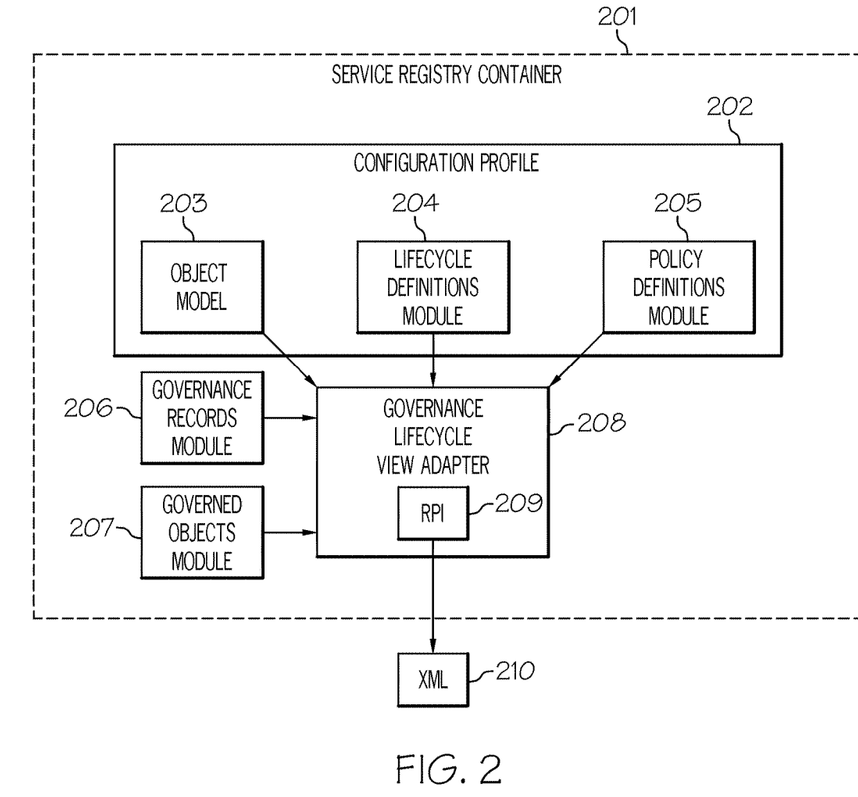
FIG. 2 illustrates the software components used in graphically displaying lifecycle information of a governed object in a service registry in combination with the policies associated with the lifecycle states in accordance with an embodiment of the present invention.
Figure 3:
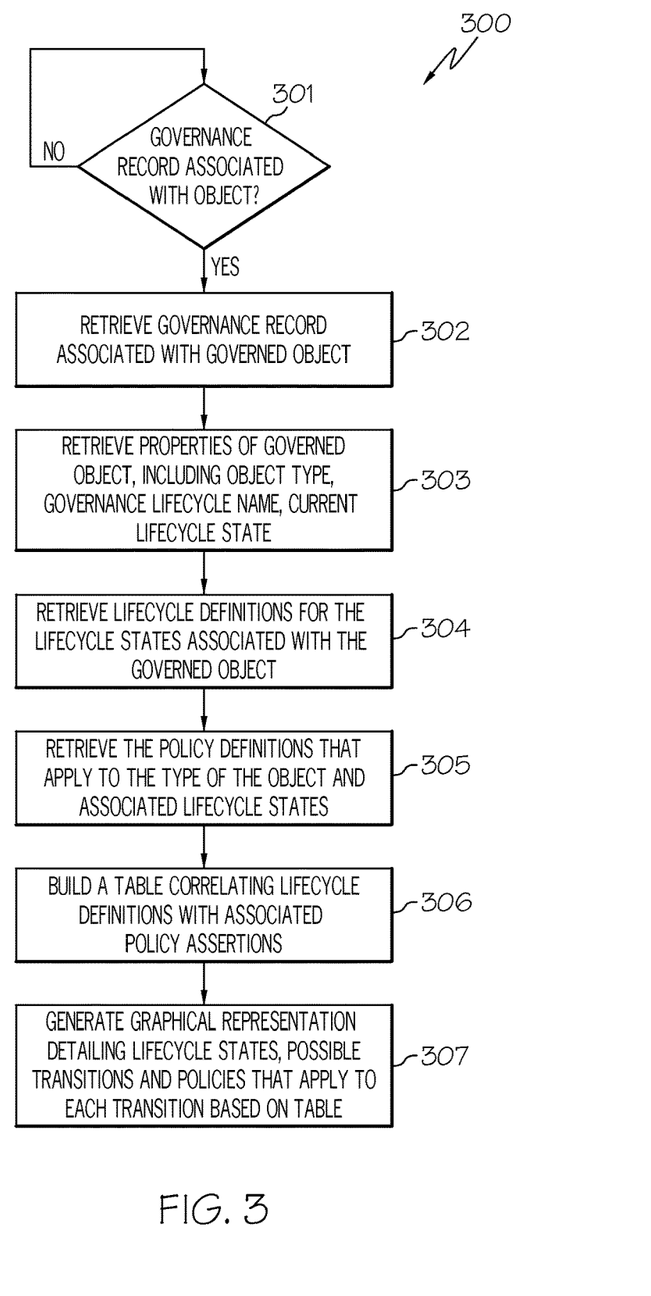
FIG. 3 is a flowchart of a method for graphically displaying lifecycle information of a governed object in a service registry in combination with the policies associated with the lifecycle states in accordance with an embodiment of the present invention.
Figure 4:
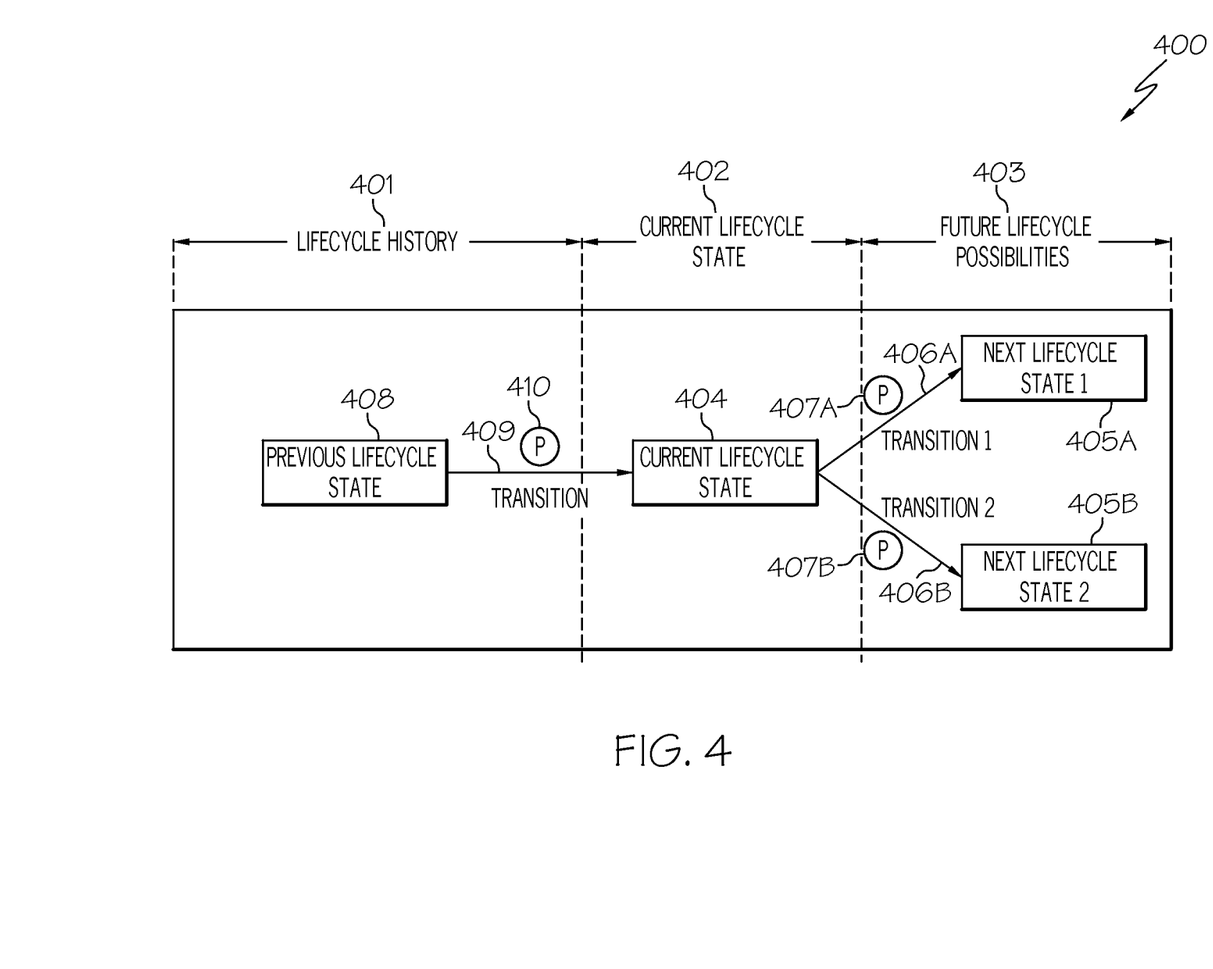
FIG. 4 illustrates a graphical view generated by the governance lifecycle view adapter in accordance with an embodiment of the present invention.

The principles of the present invention provide a means for graphically displaying lifecycle information of a governed object in a service registry in combination with the policies associated with the lifecycle states as discussed below in connection with FIGS. 2-4. FIG. 2 is a diagram of the software components used in graphically displaying lifecycle information of a governed object in a service registry in combination with the policies associated with the lifecycle states. FIG. 3 is a flowchart of a method for graphically displaying lifecycle information of a governed object in a service registry in combination with the policies associated with the lifecycle states. FIG. 4 illustrates the graphical view generated by the governance lifecycle view adapter.

As stated above, FIG. 2 is a diagram of the software components used in graphically displaying lifecycle information of a governed object in a service registry in combination with the policies associated with the lifecycle states. In one embodiment, these software components may reside in application 104 (FIG. 1).

Referring to FIG. 2, the software components include a service registry container 201. In one embodiment, service registry container 201 is an index of information about a service enabling the corresponding service document to be located and accessed in a repository (or even the corresponding service located at the service provider). In one embodiment, the repository (not shown) is combined with service registry container 201. An example of an integrated service registry and repository is IBM® WebSphere® Registry and Repository (WSRR).

Service registry container 201 may include a configuration profile 202 that stores information, such as an object model 203, a lifecycle definitions module 204 and a policy definitions module 205. Object model 203 stores information relating to the properties of objects (e.g., object type, such as business service, document). In one embodiment, such information is represented in Web Ontology Language (OWL). Lifecycle definitions module 204 stores the various states (e.g., assemble, deploy, manage, retire) an object can transition through its life. In one embodiment, such information is represented in State Adaptive Choreography Language (SACL). Policy definitions module 205 store the policies or rules that are applied to objects (e.g., a specific type of document to be attached to a particular type of object). In one embodiment, such information is represented in WS-Policy.

Additionally, service registry container 201 includes a governance record module 206. In one embodiment, governance records module 206 stores the details regarding the previous transitions and states of objects in records. Furthermore, service registry container 201 includes a governed objects module 207 which stores the properties (e.g., governance lifecycle name, current lifecycle state) of objects in service registry 201 that are governed. Objects refer to service objects or logical objects derived from documents as well as instances of such objects. An object is said to be governed if it currently has a lifecycle associated with it. In one embodiment, governed object properties and governance records can be access through internal APIs provided by the triple store that stores various types of objects in service registry 201.

Service registry container 201 additionally includes a governance lifecycle view adapter 208 configured to generate a graphical plot displaying lifecycle information of a governed object in a service registry in combination with the policies associated with the lifecycle states. A more detail description of the functionality of governance lifecycle view adapter 208 is discussed below in connection with FIGS. 3 and 4.

The graphical plot generated by governance lifecycle view adapter 208 is accessible by a client application via an Application Programming Interface (API) 209, where the graphical output of the governance lifecycle along with its related policy and history information can be provided in an XML representation 210. In one embodiment, governance lifecycle view adapter 208 can be implemented to return an interactive HTML with definitions of images represented in Scalable Vector Graphics (SVG).

As stated above, FIG. 3 is a flowchart of a method 300 for graphically displaying lifecycle information of a governed object in a service registry in combination with the policies associated with the lifecycle states in accordance with an embodiment of the present invention.

Referring to FIG. 3, in conjunction with FIGS. 1-2, in step 301, a determination is made by governance lifecycle view adapter 208 as to whether there is a governance record in governance records module 206 that is associated with the object of service registry 201 whose lifecycle and policy assertions are to be graphically displayed. If there is a governance record in governance records module 206 associated with the object, then the object in question has a lifecycle applied to it (i.e., the object is a governed object). As a result, its previous transitions and states are stored in record(s) in governance records module 206. Otherwise, the object in question has not been governed.

If there is not a governance record in governance records module 206 that is associated with the object of service registry 201 whose lifecycle and policy assertions are to be graphically displayed, then governance lifecycle view adapter 208 determines whether there is a governance record in governance records module 206 that is associated with another object of service registry 201 whose lifecycle and policy assertions are to be graphically displayed.

If, however, there is a governance record in governance records module 206 that is associated with the object of service registry 201 whose lifecycle and policy assertions are to be graphically displayed, then, in step 302, governance lifecycle view adapter 208 retrieves the governance record associated with the governed object from governance records module 206. In one embodiment, the retrieved governance record includes details of previous transitions and states of the governed object.

In step 303, governance lifecycle view adapter 208 retrieves properties of the governed object, such as the object type (e.g., business service, document) from object model 203, the governance lifecycle name from governed objects module 207 and the current lifecycle state from governed objects module 207.

In step 304, governance lifecycle view adapter 208 retrieves the lifecycle definitions from lifecycle definitions module 204 for the lifecycle states, including both current and next possible (future) lifecycle states, associated with the governed object.

In step 305, governance lifecycle view adapter 208 retrieves the policy definitions from policy definitions module 205 that apply to the type of the object (retrieved in step 303) and associated lifecycle states (i.e., the current and next possible lifecycle states).

In step 306, governance lifecycle view adapter 208 builds a table correlating the retrieved lifecycle definitions for the lifecycle states, both current and next possible lifecycle states, with the retrieved policy definitions (i.e., the associated policy assertions. In this manner, the relationship between lifecycle transitions and policy definitions using the object type retrieved from object model 203 in step 303 can be determined as discussed below. As a result, a graphical representation, discussed below, may be generated that details the lifecycle states, including the next possible transitions and the policies that apply at each transition. In one embodiment, the table built in step 306 is generated as an in-memory relationship table since the policy assertions may be modified at runtime without the knowledge of the associated governed object.

In step 307, governance lifecycle view adapter 208 generates a graphical representation detailing the lifecycle states, the next possible transitions and the policies that apply to each transition. The historical information is retrieved through the governance record retrieved in step 302. The current state of the object is obtained from governed objects module 207 in step 303. The possible transitions and the associated policies are obtained from the table built in step 306 using the object type retrieved from object model 203 in step 303.

In one embodiment, the graphical plot generated by governance lifecycle view adapter 208 is accessible by a client application via API 209, where the graphical output of the governance lifecycle along with its related policy and history information can be provided in an XML representation 210. In one embodiment, governance lifecycle view adapter 208 can be implemented to return an interactive HTML with definitions of images represented in Scalable Vector Graphics (SVG).

An example of such a graphical plot is provided in FIG. 4. FIG. 4 illustrates the graphical view generated by governance lifecycle view adapter 208 in accordance with an embodiment of the present invention.

Referring to FIG. 4, in conjunction with FIGS. 1-3, graphical plot 400 generated by governance lifecycle view adapter 208 displays the lifecycle information of the governed object in three domains, depicting the past 401 (labeled "lifecycle history"), the present 402 (labeled "current lifecycle state") and the future 403 (labeled "future lifecycle possibilities") lifecycle states of the governed object.

The current lifecycle state 404 has links to next possible lifecycle states 405A, 405B (labeled "next lifecycle state 1," "next lifecycle state 2," respectively) through transitions 406A, 406B, respectively (labeled "transition 1," "transition 2," respectively). Next possible lifecycle states 405A-405B may collectively or individually be referred to as next possible states 405 or next possible state 405, respectively. Transitions 406A-406B may collectively or individually be referred to as transitions 406 or transition 406, respectively. The policy assertions that apply to each of these transitions 406 are also indicated in graphical plot 400. For instance, policy assertions 407A, 407B apply to transitions 406A, 406B, respectively. Policies 407A-407B may collectively or individually be referred to as policies 407 or policy 407, respectively.

While FIG. 4 illustrates two particular next lifecycle states 405 that may be transitioned through transitions 406, governance lifecycle view adapter 208 may generate any number of next possible states 405 with the corresponding transitions 406 and applicable policies 407 based on the table built in step 306 and the object type retrieved from object model 203 in step 303. The principles of the present invention are not to be limited to the depicted graph of FIG. 4.

The historical lifecycle state 401 depicting the previous lifecycle state 408 and the transition details for transitioning to current lifecycle state 404 through transition 409 and the applicable policies 410 are obtained from the governance record retrieved in step 302. While FIG. 4 illustrates a single previous lifecycle state 408, governance lifecycle view adapter 208 may generate any number of previous lifecycle states 408 with the corresponding transitions 409 and applicable policies 410 based on the governance records retrieved in step 302. The principles of the present invention are not to be limited to the depicted graph of FIG. 4.

As a result, graphical plot 400 provides information regarding the current lifecycle state of the governed object, the previous lifecycle states, the next possible lifecycle states, what lifecycle state transitions are available, what policy assertions apply to each of these transitions and what policy assertions were successful and unsuccessful (those policy assertions that are not depicted were not successful).

In this manner, the lifecycle information of a governed object in a service registry is graphically displayed in combination with the policies associated with the lifecycle states.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for graphically displaying lifecycle information of a governed object in combination with policies associated with lifecycle states, the method comprising:

retrieving properties of said governed object from an object model of a configuration profile of a service registry container and from a governed objects module of said service registry container, wherein said properties comprise an object type and a current lifecycle state, wherein said object model stores information relating to properties of objects, wherein said governed objects module stores properties of objects in said service registry container that are governed;

retrieving lifecycle definitions from a lifecycle definitions module of said configuration profile of said service registry container for said current lifecycle state and one or more potential future lifecycle states associated with said governed object, wherein said lifecycle definitions module stores various states an object can transition through its life;

retrieving policy definitions from a policy definitions module of said configuration profile of said service registry container that apply to said object type, said current lifecycle state and said one or more potential future lifecycle states, wherein said policy definitions module stores policies or rules that are applied to objects;

building an in-memory relationship table correlating said lifecycle definitions for said current lifecycle state and said one or more potential future lifecycle states with said policy definitions thereby determining relationships between lifecycle transitions and policy definitions; and generating, by a processor utilizing a governance lifecycle view adapter of said service registry container, a graphical representation detailing said current lifecycle state, transitions to said one or more potential future lifecycle states and said policy definitions that apply to each transition for said governed object using said table, wherein said graphical representation is accessible by a client application of an end user via an application programming interface.

2. The method as recited in claim 1 further comprising:

retrieving a governance record for said governed object, wherein said governance record comprises information directed to a historical transition and a historical lifecycle state of said governed object.

3. The method as recited in claim 2 further comprising:
generating said graphical representation detailing said historical transition and said historical lifecycle state of said governed object.

4. The method as recited in claim 1, wherein said graphical representation is provided in an XML representation.

5. The method as recited in claim 1, wherein said properties of said governed object are represented in a web ontology language.

6. The method as recited in claim 1, wherein said lifecycle definitions are represented in a state adaptive choreography language.

7. The method as recited in claim 1, wherein said policy definitions are represented in a WS-Policy.

* * * * *